TELEPHONE PLANT WITH SATELLITE EXCHANGES CONNECTED BY RADIAL AND TRANSVERSE CHANNELS

Filed Oct. 17, 1966

INVENTOR.
Nils Herbert Edström
BY Hane and Nydick
Attorneys

INVENTOR.
NILS HERBERT EDSTRÖM
BY Hane and Nydick
ATTORNEYS

United States Patent Office 3,524,940
Patented Aug. 18, 1970

3,524,940
TELEPHONE PLANT WITH SATELLITE EXCHANGES CONNECTED BY RADIAL AND TRANSVERSE CHANNELS

Nils Herbert Edstrom, Vallingby, Sweden, assignor to Telefonaktiebolaget L M Ericsson, Stockholm, Sweden, a corporation of Sweden Filed Oct. 17, 1966, Ser. No. 587,094
Claims priority, application Sweden, Nov. 2, 1965, 14,115/65
Int. Cl. H04m *3/54, 3/60*
U.S. Cl. 179—18 3 Claims

ABSTRACT OF THE DISCLOSURE

A telephone plant or system includes a main or central exchange and a plurality of minor or satellite exchanges. Radial channels connect the central exchange to each of the satellite exchanges. In addition, there are transverse channels between pairs of satellite exchanges. A data machine or computer at the central exchange controls switching between the central exchange and each of the satellite exchanges by the use of address information associated with each of the satellite exchanges. Synchronizing signals between the central and satellite exchanges are used by the latter to indicate to the latter that there is a fault-free connection to the central exchange. When such a connection opens, the associated satellite exchange establishes a connection via a transverse channel to another satellite exchange so that the satellite exchange is now connected to the central exchange via the transverse channel and the radial channel of the other satellite exchange.

Figure 1:
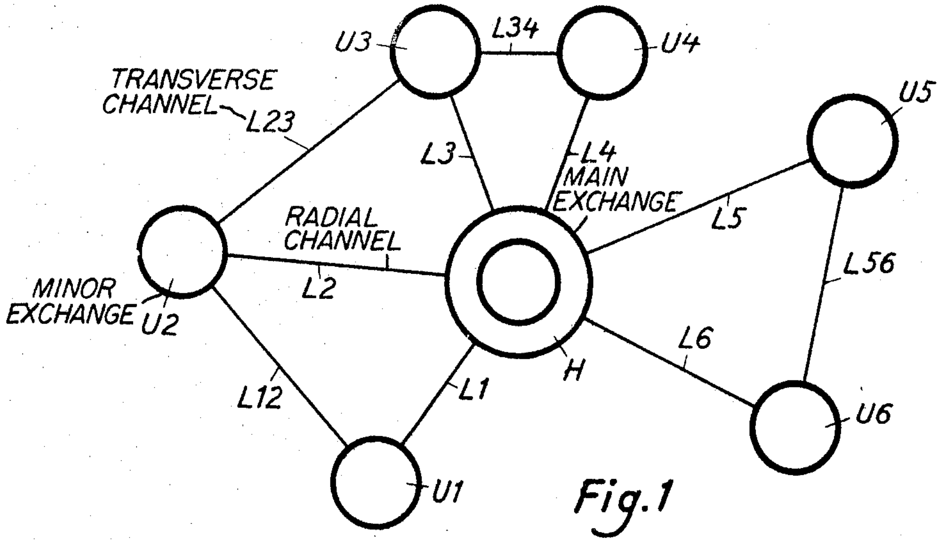

The present invention refers to a telephone plant or system comprising a main exchange with a data machine or computer for controlling switching processes within the plant, and a great number of minor or satellite exchanges, positioned at a distance from the main exchange and controlled by the data machine wherein between the main exchange and the minor exchanges there are both radial data channels for transmission of switching data and radial connection channels for transmission of speech information between subscribers connected to any of the exchanges.

In a data control led telephone plant the basic cost for the data machine is large and therefore there must be a great number of subscribers to amortize the cost of the data machine. For cases where only a small number of subscribers will be connected to an exchange the principle of selected units is therefore used, the selected units being controlled by the data machine located in the main exchange. This main exchange is connected to the selected units through data channels for controlling switching processes and through connection channels for speech trasmission. The data channels as well as the connection channels are used for transmission of information in both directions between the main exchange and the selected units.

For various reasons cable breaks or signal-drop-outs may occur in connections between the main exchange and a selected unit. This would mean a total operation interruption for the selected unit since such units do not include certain units that are necessary for the connection of a call as well as for the obtaining of e.g. registering functions, and digit analyzing and testing functions. From many points of view such an operation interruption is undesirable, particularly since it may be presumed that in certain situations a drop-out of a connection link between the main exchange and a selected unit is associated with a catastrophic situation. This is the case in military networks, where the selected units may consist of tactically mobile exchanges, that must still be in working order during a hostile attack on the connections of the network. In some other countries, for example in Australia and in South Africa, catastrophic situations of another kind may arise when grass fires may break off the connection between the main exchange and the selected unit in a village so that all the communication locally within the village as well as between the village and the world around is disrupted.

An object of the present invention is to eliminate the disadvantages mentioned above without making an uneconomic extension of the selected units or the connections between a selected unit and the main exchange, that is, the economic motivation for using a data machine in the main exchange of the telephone plant should be unchanged. A plant constructed according to the invention is characterized in that between two or several of said minor exchanges transverse data channels are connected as a reserve for the radial data channels, connected directly between the main exchange and the minor exchanges. In addition, each minor exchange is provided with a sensing device for sensing the data channel connecting the minor exchanges to the main exchange, the sensing device in a minor exchange being arranged to connected an alternative transverse data channel to another minor exchage when there is a drop-out of synchronizing pulses on the radial data channel between the minor exchange in question and the main exchange. In addition, the data machine is arranged to send identity data defining the minor exchanges on at least two radial data channels at the same time between the main exchange and two minor exchanges.

Figure 2:
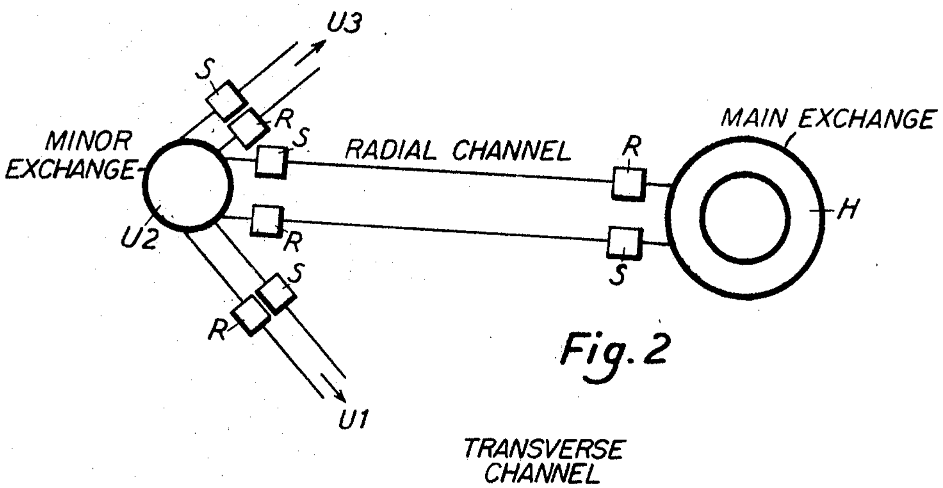
Figure 4:
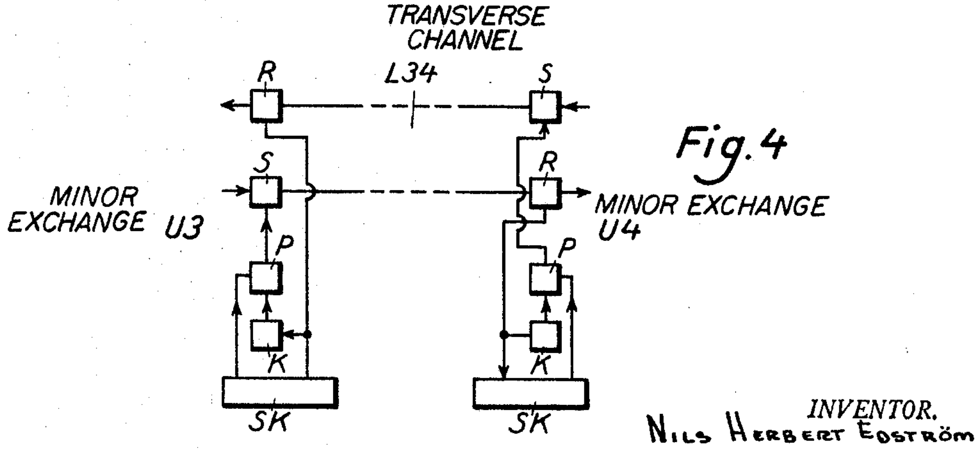
Figures 3, 3A:
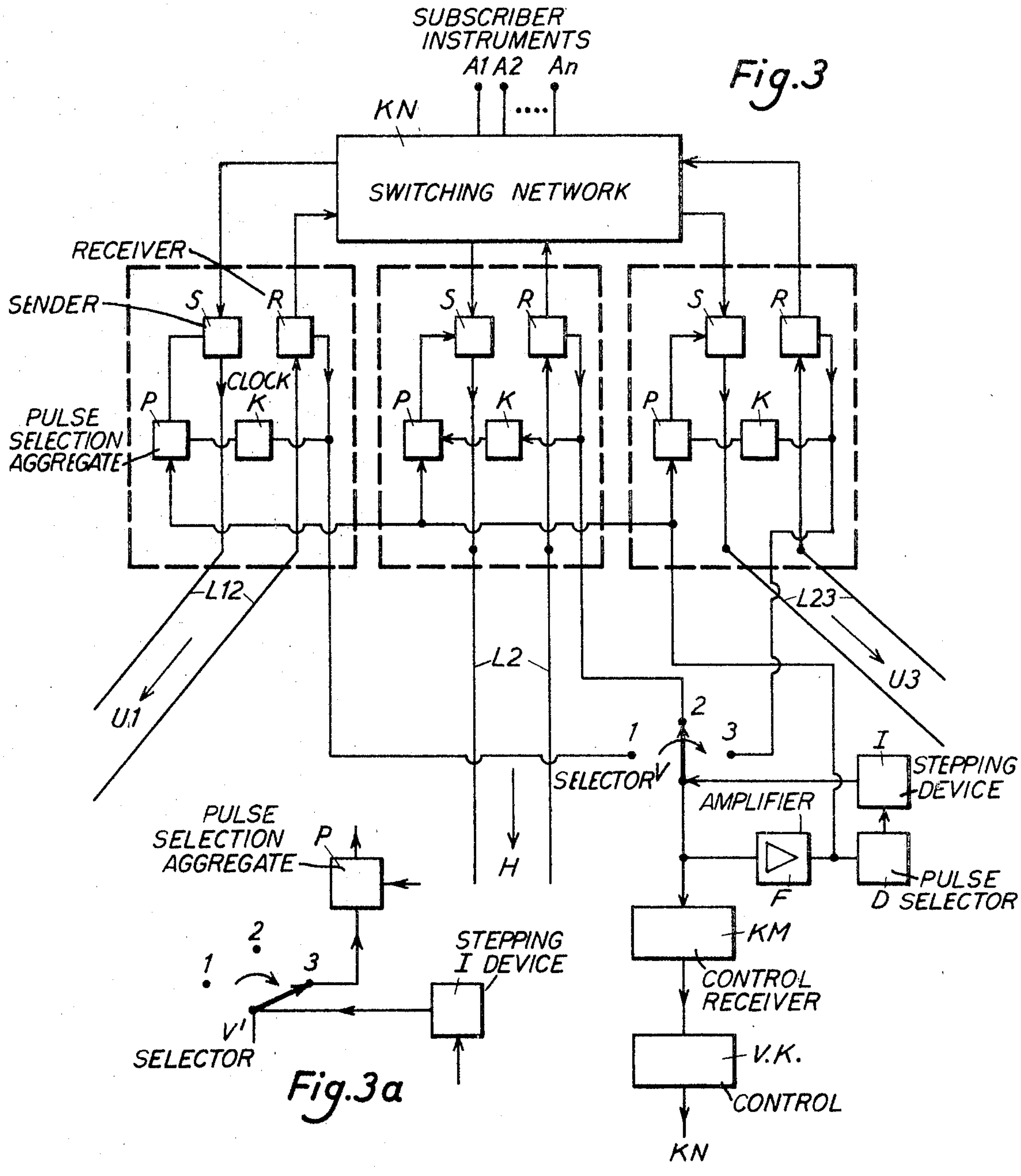

The invention will hereinafter be more fully described by making reference to the schematical drawings, where FIG. 1 shows a telephone plant comprising a main exchange H and six selected units or minor exchanges U1–U6, FIG. 2 shows the main exchange, a selected unit and several channels connected to the unit, FIG. 3 shows the interaction between the switching network and the channels of a selected unit, FIG. 3*a* shows a detail of FIG. 3 and FIG. 4 shows more in detail the control of such a channel.

In FIG. 1 a telephone plant is shown with the main exchange H which is provided with a data machine for controlling switching processes within the plant, and six minor exchanges U1–U6 positioned at a rather long distance from the main exchange and controlled by the data machine. Between the main exchange H and the minor exchanges U1–U6 there are radial data channels for transmission of switching data, and radial connection channels for transmission of speech information between subscribers connected to one of said exchanges. These channels are represented in FIG. 1 of the drawing by connections or cable L1–L6, each connection L can represent two separate physical lines or one physical line with two carrier frequency channels or one physical line plus a radio connection or two separate radio connections. Since the description to follow particularly refers to the data transmission used to control interconnection of the exchanges, only the data transmission lines are shown in order to simplify the drawings. However, it should be realized that in any working telephone system there would also be related speech transmission lines.

Apart from connections L1–L6 transverse connections L12–L56 between some of the minor exchanges are shown in FIG. 1, that is, L12 connection between U1 and U2, connection L23 between U2 and U3, connection L34 between U3 and U4 and connection L56 between U5 and U6. These transverse connections comprise data channels as a reserve for the radial data channels connected directly between the main exchange and the minor exchanges and connection channels for the speech information.

A telephone plant of the mentioned kind is arranged so that the data machine of the main exchange H effects the connecting of a determined data channel for the transmission of signals between a certain minor exchange and the main exchange, these signals being all signals that are required for the activation of necessary functions from the time when a subscriber lifts his handset until a connection between two subscribers is again disconnected. The data machine hereby successively connects the data channels one after the other so that, while one data channel is connected, information about subsequent functions of other data channels is collected and stored. And so, when a determined data channel has obtained a wanted information and stored it in a data register, the data machine is called again according to the programme, whereafter the required function is carried out according to the machine programming. In this way it is possible to control each minor exchange in detail from the main exchange by the data machine.

The telephone plant according to the invention is constructed in such a way that when a connection between a minor exchange and the main exchange is required the data machine causes the sending of an order, this order being not for the connecting of a determined data channel but for the sending of the identifying number of the minor exchange on two or more of the data channels of the plant. There is thus eliminated the need for programming for the choice of required data senders and their connection, and the need for individual sending and reception registers for the data channels. It is not important how the identifying numbers are sent between the main exchange and the minor exchange since each minor exchange recognizes its own identifying number and ignores any other signal .

In each group of two or three minor exchanges in a plant according to the invention there are transverse data channels between the minor exchanges with the radial data channels between the main exchange and the minor exchanges maintained. These transverse data channels are to be considered as reserve channels since normally the information interchange with a minor exchange is carried out through the radial data channel connecting the minor exchange and the main exchange. As this radial data channel is always connected (even if it does not always transmit information) it is known when it is working or is not working when certain synchronizing signals cease because an error occurs on the channel.

If and when a transverse data channel is to be used is not determined by the data machine but by the data channels themselves wherein a transverse data channel towards a minor exchange is connected to the control logic only when the radial data channel to the main exchange is not working. With control logic is understood the units V–KM–F–D–I according to FIG. 3 which will be more fully described.

In the telephone plant according to the invention there is in each minor exchange a device that senses the data channel connecting the minor exchange and the main exchange by detecting the presence of synchronizing impulses and at its drop-out automatically connects a transverse data channel. FIG. 3 schematically shows some details of such a device for the minor exchange (selected unit) U2 which is connected to the main exchange H through a radial data channel L2 and which is connected to the minor exchanges U1 and U2 respectively through transverse data channels L12 and L23. The data channels are connected to a switching network KN each one through its receiver R and sender S from which network subscribers' connections A1, A2 . . . A*n* originate. The receiver R of the radial data channel L2 is connected to an amplifier F and a pulse detector D through an input 2 of a selector V, the pulse detector transmitting no signals as long as synchronizing impulses are received by receiver R. If this transmission of synchronizing impulses on the radial data channel is broken the pulse detector starts transmitting and operates the stepping device I so that it steps the selector V by one step to the input 3, whereby the transverse data channel L23 between the minor exchanges U2 and U3 is connected. In case this data channel L23 would also not be working the pulse detector D starts operating again and, via the stepping device I, causes the selector V to step forward to the input 1, that is, the transverse data channel L12 between the minor exchanges U1 and U2 is connected. Normally these transverse data channels are constantly in the no-load operation and feed synchronizing impulses, and so, when, for example, the data channel L23 is connected, the selector V is traversed by synchronizing impulses from the receiver R of this data channel via the input 3. By the stepping of the selector V from position 2 to 3 the transverse data channel L23 is automatically connected to the switching network KN at the same time as a signal in code form is transmitted to the other end of the data channel L23 in the minor exchange U3 and establishes connection between this transverse data channel and the radial data channel of the minor exchange U3. The transmission of the signal in code form may be done in many ways, and one of the ways is shown in the schematical FIG. 3*a* extracted from FIG. 3. The stepping device I operates not only the selector V in FIG. 3 but also a selector $V^1$ in FIG. 3*a* (V and $V^1$ may be a bipolar selector). From the contact point 3 of the selector $V^1$ there is a connection going to the pulse selection aggregate P (the same as in FIG. 3). The signal fed from stepping device I, via selector $V^1$, to pulse aggregate P, causes the latter to actuate sender S to send a signal, consisting for example of a number of "0" and "1" in a certain determined order (code). When this signal arrives at the receiver R of the minor exchange, it is identified by the control receiver KM of this exchange, and the result of this identifying implies that a cross connection is made between the transverse data channel L12 and the radial data channel L3.

Information coming to the minor exchange U3 from the main exchange will thus be repeated to the minor exchange U2 which receives the information in a control receiver KM connected to the selector V. Information preceded by the identifying number of the minor exchange U2 is identified by the control receiver KM and is made accessible in the swtiching network KN.

Senders S mentioned before are controlled by synchronizing signals from the receiver R in the associated data channel. For this purpose there is a clock K and a particular pulse selection aggregate P by means of which the sending is controlled, starting from the synchronizing impulses coming in to the receiver R and with cooperation of a signal from the input of the pulse detector D. A particular sender S can send only provided that the associated aggregate P feeds synchronizing pulses.

In FIG. 4 the left part is assumed to belong to the minor exchange U3 and the right part is assumed to belong to the minor exchange U4. It is furthermore assumed that the radial data connection of the minor exchange U3 to the main exchange is not working, and so the transverse data channel L34 is to be inserted. The switching control unit SK forms a combination of the units V, $V^1$, K, VK, F, D and I in the respective exchange. When the error occurs in the radial data connection the stepping device I gives a stepping impulse to the selectors V and $V^1$ in the exchange U3. From the units I and F in SK, signals are then supplied to pulse aggregate P which in turn causes the sending of said coded signal from the unit S in the exchange U3 to the unit R in the exchange U4. In this exchange a signal is then transmitted in the circuit R–K–P–S as mentioned above whereby the cross connection mentioned before is made possible between the transverse data channel L34 and the radial data channel of the exchange U4 and the required synchronizing of the sender S at the minor exchange U4 is made. On the "sender side" in exchange U3 the pulse aggregate P is thus controlled from amplifier F while on the "receiver side" in U4 the pulse selection aggregate P is controlled from the clock K.

I claim:

1. A telephone system comprising a central exchange, a plurality of satellite exchanges for servicing a plurality of telephone instruments, a plurality of radial channels connecting said central exchange to each of said satellite exchanges, respectively, said central exchange including means for transmitting synchronizing signals via said radial channels to each of said satellite exchanges, said central exchange further including a data processing device for generating switching data for controlling switching operations to be performed by a particular satellite exchange identified by address information included in said switching data defining said particular satellite exchange, said switching data being transmitted via said radial channels to pluralities of said satellite exchanges, a plurality of transverse channels, each of said transverse channels interconnecting a pair of said satellite exchanges, each of said satellite exchanges including means for detecting the synchronizing signals and control means responsive to the absence of the synchronizing signals to transmit control signals via an associated transverse channel to the other satellite exchange connected thereto, said other satellite exchange including means responsive to the receipt of the control signals for transmitting the switching data received for its radial channel to said transverse channel so that the two satellite exchanges connected by the transverse channel simultaneously receive switching data from said central exchange via the radial channel of said other satellite exchange.

2. The system of claim 1 wherein said control means includes a first selector for selectively connecting the satellite exchange selectively to the radial and transverse channels, said selector connecting the satellite exchange to the associated radial channel until the synchronizing signals are not detected and then operatively connecting the satellite exchange to a transverse channel.

3. The system of claim 2 wherein said control means further includes a second selector operating in synchronism with said first selector and a pulse code generator for generating a particular code identifying the satellite exchange, said second selector connecting said pulse code generator to the transverse channel to identify the satellite exchange to the satellite exchange at the other end of said transverse channel.

References Cited

UNITED STATES PATENTS

| | | |
|---|---|---|
| 3,060,273 | 10/1962 | Nowak et al. |
| 3,309,467 | 3/1967 | Gorgas et al. |

WILLIAM C. COOPER, Primary Examiner